US008463850B1

(12) United States Patent
McCann

(10) Patent No.: US 8,463,850 B1
(45) Date of Patent: Jun. 11, 2013

(54) SYSTEM AND METHOD OF ALGORITHMICALLY GENERATING A SERVER SIDE TRANSACTION IDENTIFIER

(75) Inventor: Benjamin E. McCann, Lowell, MA (US)

(73) Assignee: F5 Networks, Inc., Seattle, WA (US)

( * ) Notice: Subject to any disclaimer, the term of this patent is extended or adjusted under 35 U.S.C. 154(b) by 56 days.

(21) Appl. No.: 13/282,307

(22) Filed: Oct. 26, 2011

(51) Int. Cl.
*G06F 15/16* (2006.01)

(52) U.S. Cl.
USPC ............................ 709/203; 709/217; 709/224

(58) Field of Classification Search
USPC .......................... 709/203, 217–219, 223–224
See application file for complete search history.

(56) References Cited

U.S. PATENT DOCUMENTS

| 4,993,030 | A | 2/1991 | Krakauer et al. |
| 5,218,695 | A | 6/1993 | Noveck et al. |
| 5,282,201 | A | 1/1994 | Frank et al. |
| 5,303,368 | A | 4/1994 | Kotaki |
| 5,473,362 | A | 12/1995 | Fitzgerald et al. |
| 5,511,177 | A | 4/1996 | Kagimasa et al. |
| 5,537,585 | A | 7/1996 | Blickenstaff et al. |
| 5,548,724 | A | 8/1996 | Akizawa et al. |
| 5,550,965 | A | 8/1996 | Gabbe et al. |
| 5,583,995 | A | 12/1996 | Gardner et al. |
| 5,586,260 | A | 12/1996 | Hu |
| 5,590,320 | A | 12/1996 | Maxey |
| 5,623,490 | A | 4/1997 | Richter et al. |
| 5,649,194 | A | 7/1997 | Miller et al. |
| 5,649,200 | A | 7/1997 | Leblang et al. |
| 5,668,943 | A | 9/1997 | Attanasio et al. |
| 5,692,180 | A | 11/1997 | Lee |
| 5,721,779 | A | 2/1998 | Funk |
| 5,724,512 | A | 3/1998 | Winterbottom |
| 5,806,061 | A | 9/1998 | Chaudhuri et al. |
| 5,832,496 | A | 11/1998 | Anand et al. |
| 5,832,522 | A | 11/1998 | Blickenstaff et al. |
| 5,838,970 | A | 11/1998 | Thomas |
| 5,862,325 | A | 1/1999 | Reed et al. |

(Continued)

FOREIGN PATENT DOCUMENTS

| AU | 2003300350 A1 | 7/2004 |
| CA | 2080530 A1 | 4/1994 |

(Continued)

OTHER PUBLICATIONS

Baer, T., et al., "The elements of Web services" ADTmag.com, Dec. 1, 2002, pp. 1-6, (http://www.adtmag.com).

(Continued)

*Primary Examiner* — Philip B Tran
(74) *Attorney, Agent, or Firm* — LeClairRyan, a Professional Corporation

(57) ABSTRACT

A system, medium and method for generating a server side transaction ID (XID') is disclosed. A request is received from a client device to access a server. The request includes a source port, source IP address, protocol information and a client generated transaction ID (XID). An endian'ness of the client of determined and classified. A Client ID unique to the client request is then generated using the source port, source IP address, protocol information, and a Masked XID generated from the endian'ness determination and the XID. A server side transaction ID (XID') is then synthesized by combining the Client ID and an XID halfword containing least significant bits (LSB) identified from the endian'ness determination. The XID' is then transmitted to the file server, wherein the XID' is associated with the XID for the corresponding client request.

18 Claims, 7 Drawing Sheets

U.S. PATENT DOCUMENTS

| | | | |
|---|---|---|---|
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,029,168 A | 2/2000 | Frey |
| 6,029,175 A | 2/2000 | Chow et al. |
| 6,041,365 A | 3/2000 | Kleinerman |
| 6,044,367 A | 3/2000 | Wolff |
| 6,047,129 A | 4/2000 | Frye |
| 6,067,558 A | 5/2000 | Wendt et al. |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,154,777 A | 11/2000 | Ebrahim |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,259,405 B1 | 7/2001 | Stewart et al. |
| 6,260,070 B1 | 7/2001 | Shah |
| 6,282,610 B1 | 8/2001 | Bergsten |
| 6,289,345 B1 | 9/2001 | Yasue |
| 6,292,832 B1 | 9/2001 | Shah et al. |
| 6,304,913 B1 | 10/2001 | Rune |
| 6,308,162 B1 | 10/2001 | Ouimet et al. |
| 6,324,581 B1 | 11/2001 | Xu et al. |
| 6,330,574 B1 | 12/2001 | Murashita |
| 6,338,082 B1 | 1/2002 | Schneider |
| 6,339,785 B1 | 1/2002 | Feigenbaum |
| 6,349,343 B1 | 2/2002 | Foody et al. |
| 6,353,848 B1 | 3/2002 | Morris |
| 6,363,056 B1 | 3/2002 | Beigi et al. |
| 6,370,527 B1 | 4/2002 | Singhal |
| 6,374,263 B1 | 4/2002 | Bunger et al. |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,513,061 B1 | 1/2003 | Ebata et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,578,069 B1 | 6/2003 | Hopmann et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,615,267 B1 | 9/2003 | Whalen et al. |
| 6,654,346 B1 | 11/2003 | Mahalingaiah et al. |
| 6,701,415 B1 | 3/2004 | Hendren, III |
| 6,721,794 B2 | 4/2004 | Taylor et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,795,860 B1 | 9/2004 | Shah |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,865,593 B1 | 3/2005 | Reshef et al. |
| 6,868,447 B1 | 3/2005 | Slaughter et al. |
| 6,871,221 B1 | 3/2005 | Styles |
| 6,871,245 B2 | 3/2005 | Bradley |
| 6,880,017 B1 | 4/2005 | Marce et al. |
| 6,883,137 B1 | 4/2005 | Girardot et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Seddigh et al. |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,003,533 B2 | 2/2006 | Noguchi et al. |
| 7,003,564 B2 | 2/2006 | Greuel et al. |
| 7,006,981 B2 | 2/2006 | Rose et al. |
| 7,010,553 B2 | 3/2006 | Chen et al. |
| 7,013,379 B1 | 3/2006 | Testardi |
| 7,020,644 B2 | 3/2006 | Jameson |
| 7,020,699 B2 | 3/2006 | Zhang et al. |
| 7,023,974 B1 | 4/2006 | Brannam et al. |
| 7,024,427 B2 | 4/2006 | Bobbitt et al. |
| 7,039,061 B2 | 5/2006 | Connor et al. |
| 7,051,112 B2 | 5/2006 | Dawson |
| 7,054,998 B2 | 5/2006 | Arnott et al. |
| 7,065,482 B2 | 6/2006 | Shorey et al. |
| 7,072,917 B2 | 7/2006 | Wong et al. |
| 7,075,924 B2 | 7/2006 | Richter et al. |
| 7,076,689 B2 * | 7/2006 | Atkinson ........................ 714/11 |
| 7,080,314 B1 | 7/2006 | Garofalakis et al. |
| 7,089,286 B1 | 8/2006 | Malik |
| 7,089,491 B2 | 8/2006 | Feinberg et al. |
| 7,111,115 B2 | 9/2006 | Peters et al. |
| 7,113,962 B1 | 9/2006 | Kee et al. |
| 7,113,996 B2 | 9/2006 | Kronenberg |
| 7,120,128 B2 | 10/2006 | Banks et al. |
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |

| Patent No. | Date | Inventor |
|---|---|---|
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,496 B2 | 1/2007 | Tanaka et al. |
| 7,173,929 B1 | 2/2007 | Testardi |
| 7,191,163 B2 | 3/2007 | Herrera et al. |
| 7,194,579 B2 | 3/2007 | Robinson et al. |
| 7,228,359 B1 | 6/2007 | Monteiro |
| 7,234,074 B2 | 6/2007 | Cohn et al. |
| 7,236,491 B2 | 6/2007 | Tsao et al. |
| 7,240,100 B1 | 7/2007 | Wein et al. |
| 7,280,536 B2 | 10/2007 | Testardi |
| 7,284,150 B2 | 10/2007 | Ma et al. |
| 7,292,541 B1 | 11/2007 | C S |
| 7,293,097 B2 | 11/2007 | Borr |
| 7,293,099 B1 | 11/2007 | Kalajan |
| 7,293,133 B1 | 11/2007 | Colgrove et al. |
| 7,296,263 B1 | 11/2007 | Jacob |
| 7,308,475 B1 | 12/2007 | Pruitt et al. |
| 7,324,533 B1* | 1/2008 | DeLiberato et al. .......... 370/401 |
| 7,343,398 B1 | 3/2008 | Lownsbrough |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,644,109 B2 | 1/2010 | Manley et al. |
| 7,653,699 B1 | 1/2010 | Colgrove et al. |
| 7,689,596 B2 | 3/2010 | Tsunoda |
| 7,694,082 B2 | 4/2010 | Golding et al. |
| 7,711,771 B2 | 5/2010 | Kirnos |
| 7,734,603 B1 | 6/2010 | McManis |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,908,245 B2* | 3/2011 | Nakano et al. ................ 707/607 |
| 7,913,053 B1 | 3/2011 | Newland |
| 7,953,701 B2 | 5/2011 | Okitsu et al. |
| 7,958,347 B1 | 6/2011 | Ferguson |
| 8,005,953 B2 | 8/2011 | Miloushev et al. |
| 8,069,225 B2* | 11/2011 | McCanne et al. ............. 709/219 |
| 2001/0007560 A1 | 7/2001 | Masuda et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0012352 A1 | 1/2002 | Hansson et al. |
| 2002/0035537 A1 | 3/2002 | Waller et al. |
| 2002/0038360 A1 | 3/2002 | Andrews et al. |
| 2002/0059263 A1 | 5/2002 | Shima et al. |
| 2002/0065810 A1 | 5/2002 | Bradley |
| 2002/0065848 A1 | 5/2002 | Walker et al. |
| 2002/0073105 A1 | 6/2002 | Noguchi et al. |
| 2002/0083118 A1 | 6/2002 | Sim |
| 2002/0087571 A1 | 7/2002 | Stapel et al. |
| 2002/0087744 A1 | 7/2002 | Kitchin |
| 2002/0087887 A1 | 7/2002 | Busam et al. |
| 2002/0099829 A1 | 7/2002 | Richards et al. |
| 2002/0103823 A1 | 8/2002 | Jackson et al. |
| 2002/0133330 A1 | 9/2002 | Loisey et al. |
| 2002/0133491 A1 | 9/2002 | Sim et al. |
| 2002/0143819 A1 | 10/2002 | Han et al. |
| 2002/0143909 A1 | 10/2002 | Botz et al. |
| 2002/0147630 A1 | 10/2002 | Rose et al. |
| 2002/0150253 A1 | 10/2002 | Brezak et al. |
| 2002/0156905 A1 | 10/2002 | Weissman |
| 2002/0160161 A1 | 10/2002 | Misuda |
| 2002/0161911 A1 | 10/2002 | Pinckney, III et al. |
| 2002/0162118 A1 | 10/2002 | Levy et al. |
| 2002/0174216 A1 | 11/2002 | Shorey et al. |
| 2002/0188667 A1 | 12/2002 | Kirnos |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2003/0005172 A1* | 1/2003 | Chessell ........................ 709/101 |
| 2003/0009429 A1 | 1/2003 | Jameson |
| 2003/0009528 A1 | 1/2003 | Sharif et al. |
| 2003/0012382 A1 | 1/2003 | Ferchichi et al. |
| 2003/0018450 A1 | 1/2003 | Carley |
| 2003/0018585 A1 | 1/2003 | Butler et al. |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0055723 A1 | 3/2003 | English |
| 2003/0061240 A1 | 3/2003 | McCann et al. |
| 2003/0065956 A1 | 4/2003 | Belapurkar et al. |
| 2003/0074301 A1 | 4/2003 | Solomon |
| 2003/0105846 A1 | 6/2003 | Zhao et al. |
| 2003/0115218 A1 | 6/2003 | Bobbitt et al. |
| 2003/0115439 A1 | 6/2003 | Mahalingam et al. |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0149781 A1 | 8/2003 | Yared et al. |
| 2003/0156586 A1 | 8/2003 | Lee et al. |
| 2003/0159072 A1 | 8/2003 | Bellinger et al. |
| 2003/0171978 A1 | 9/2003 | Jenkins et al. |
| 2003/0177364 A1 | 9/2003 | Walsh et al. |
| 2003/0177388 A1 | 9/2003 | Botz et al. |
| 2003/0179755 A1 | 9/2003 | Fraser |
| 2003/0191812 A1 | 10/2003 | Agarwalla et al. |
| 2003/0195813 A1 | 10/2003 | Pallister et al. |
| 2003/0204635 A1 | 10/2003 | Ko et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0003266 A1 | 1/2004 | Moshir et al. |
| 2004/0006575 A1 | 1/2004 | Visharam et al. |
| 2004/0006591 A1 | 1/2004 | Matsui et al. |
| 2004/0010654 A1 | 1/2004 | Yasuda et al. |
| 2004/0015783 A1 | 1/2004 | Lennon et al. |
| 2004/0017825 A1 | 1/2004 | Stanwood et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030627 A1 | 2/2004 | Sedukhin |
| 2004/0030740 A1 | 2/2004 | Stelting |
| 2004/0030857 A1 | 2/2004 | Krakirian et al. |
| 2004/0043758 A1 | 3/2004 | Sorvari et al. |
| 2004/0054777 A1 | 3/2004 | Ackaouy et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093474 A1 | 5/2004 | Lin et al. |
| 2004/0098383 A1 | 5/2004 | Tabellion et al. |
| 2004/0098595 A1 | 5/2004 | Aupperle et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0133606 A1 | 7/2004 | Miloushev et al. |

| | | |
|---|---|---|
| 2004/0138858 A1 | 7/2004 | Carley |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0167967 A1 | 8/2004 | Bastian et al. |
| 2004/0181605 A1 | 9/2004 | Nakatani et al. |
| 2004/0199547 A1 | 10/2004 | Winter et al. |
| 2004/0213156 A1 | 10/2004 | Smallwood et al. |
| 2004/0215665 A1 | 10/2004 | Edgar et al. |
| 2004/0236798 A1 | 11/2004 | Srinivasan et al. |
| 2004/0236826 A1 | 11/2004 | Harville et al. |
| 2005/0021615 A1 | 1/2005 | Arnott et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0114701 A1 | 5/2005 | Atkins et al. |
| 2005/0117589 A1 | 6/2005 | Douady et al. |
| 2005/0165656 A1 | 7/2005 | Frederick et al. |
| 2005/0175013 A1 | 8/2005 | Le Pennec et al. |
| 2005/0187866 A1 | 8/2005 | Lee |
| 2005/0189501 A1 | 9/2005 | Sato et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1* | 11/2005 | Tien et al. ........................ 705/64 |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0031374 A1 | 2/2006 | Lu et al. |
| 2006/0045096 A1 | 3/2006 | Farmer et al. |
| 2006/0047785 A1 | 3/2006 | Wang et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0112367 A1 | 5/2006 | Harris |
| 2006/0123062 A1 | 6/2006 | Bobbitt et al. |
| 2006/0140193 A1 | 6/2006 | Kakani et al. |
| 2006/0153201 A1 | 7/2006 | Hepper et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259320 A1 | 11/2006 | LaSalle et al. |
| 2006/0259949 A1 | 11/2006 | Schaefer et al. |
| 2006/0268692 A1 | 11/2006 | Wright et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2007/0005807 A1 | 1/2007 | Wong |
| 2007/0016613 A1 | 1/2007 | Foresti et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0162891 A1 | 7/2007 | Burner et al. |
| 2007/0168320 A1 | 7/2007 | Borthakur et al. |
| 2007/0208748 A1 | 9/2007 | Li |
| 2007/0209075 A1 | 9/2007 | Coffman |
| 2007/0226331 A1 | 9/2007 | Srinivasan et al. |
| 2007/0233826 A1 | 10/2007 | Tindal et al. |
| 2008/0004022 A1* | 1/2008 | Johannesson et al. ........ 370/331 |
| 2008/0010372 A1 | 1/2008 | Khedouri et al. |
| 2008/0022059 A1* | 1/2008 | Zimmerer et al. ............ 711/162 |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0208933 A1 | 8/2008 | Lyon |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0270578 A1* | 10/2008 | Zhang et al. .................. 709/219 |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0125955 A1 | 5/2009 | DeLorme |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |
| 2009/0265396 A1 | 10/2009 | Ram et al. |
| 2009/0300161 A1 | 12/2009 | Pruitt et al. |
| 2010/0064001 A1 | 3/2010 | Daily |
| 2010/0179984 A1 | 7/2010 | Sebastian |
| 2010/0211547 A1 | 8/2010 | Kamei et al. |
| 2011/0066736 A1* | 3/2011 | Mitchell et al. ............... 709/228 |
| 2011/0087696 A1 | 4/2011 | Lacapra |

FOREIGN PATENT DOCUMENTS

| | | |
|---|---|---|
| CA | 2512312 A1 | 7/2004 |
| EP | 0605088 A3 | 7/1994 |
| EP | 0 738 970 A1 | 10/1996 |
| EP | 1081918 A2 | 3/2001 |
| JP | 63010250 A | 1/1988 |
| JP | 06-205006 | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000183935 | 6/2000 |
| NZ | 566291 A | 12/2008 |
| WO | 00/58870 A2 | 10/2000 |
| WO | 02/39696 A2 | 5/2002 |
| WO | WO 02/056181 A2 | 7/2002 |
| WO | WO 2004/061605 A2 | 7/2004 |
| WO | 2006/091040 A1 | 8/2006 |
| WO | WO 2008/130983 A1 | 10/2008 |
| WO | WO 2008/147973 A2 | 12/2008 |

OTHER PUBLICATIONS

Blue Coat, "Technology Primer: CIFS Protocol Optimization," Blue Coat Systems Inc., 2007, pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks Inc., "Deploying the Big-IP LTM for Diameter Traffic Management" F5® Deployment Guide, Publication date Sep. 2010, Version 1.2, pp. 1-19.

F5 Networks Inc., "F5 Diameter RM", Powerpoint document, Jul. 16, 2009, pp. 1-7.
F5 Networks Inc., "Routing Global Internet Users to the Appropriate Data Center and Applications Using F5's 3DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Case Information Log for 'Issues with BoNY upgrade to 4.3'", as early as Feb. 2008.
F5 Networks Inc., "F5 WANJet CIFS Acceleration", White Paper, F5 Networks Inc., Mar. 2006, pp. 1-5, Seattle, Washington.
Fajardo V., "Open Diameter Software Architecture," Jun. 25, 2004, pp. 1-6, Version 1.0.7.
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.
Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Internet Protocol, "DARPA Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, last accessed May 4, 2006, (http://news.com).
LaMONICA M., "Infravio spiffs up Web services registry idea", CNET News.com, May 11, 2004, pp. 1-2, last accessed Sep. 20, 2004, (http://www.news.com).
Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Unisversal).
Modiano E., "Scheduling Algorithms for Message Transmission Over a Satellite Broadcast System", MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, last accessed Oct. 8, 2012, (http://www.ietf.org/rfc/rfc2474.txt).
Ott D., et al., "A Mechanism for TCP-Friendly Transport-level Protocol Coordination", USENIX Annual Technical Conference, 2002, University of North Carolina at Chapel Hill, pp. 1-12.
Padmanabhan V., et al., "Using Predictive Prefetching to Improve World Wide Web Latency", SIGCOM, 1996, pp. 1-15.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
Rosen E, et al., "MPLS Label Stack Encoding", (RFC:3032) Network Working Group, Jan. 2001, pp. 1-22, last accessed Oct. 8, 2012, (http://www.ietf.org/rfc/rfc3032.txt).
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, last accessed Sep. 30, 2004, (http://www.adtmag.com).
Shohoud, Y., "Building XML Web Services with VB.NET and VB 6", Addison Wesley, 2002, pp. 1-14.
Sommers F., "Whats New in UDDI 3.0—Part 1", Web Services Papers, Jan. 27, 2003, pp. 1-4, last accessed Mar. 31, 2004, (http://www.webservices.org/index.php/article/articleprint/871/-1/24/).
Sommers F., "Whats New in UDDI 3.0—Part 2", Web Services Papers, Mar. 2, 2003, pp. 1-8, last accessed Nov. 1, 2007, (http://www.web.archive.org/web/20040620131006/).
Sommers F., "Whats New in UDDI 3.0—Part 3", Web Services Papers, Sep. 2, 2003, pp. 1-4, last accessed Mar. 31, 2007, (http://www.webservices.org/index.php/article/articleprint/894/-1/24/).
Sleeper B., "The Evolution of UDDI" UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
"UDDI Overview", Sep. 6, 2000, pp. 1-21, uddi.org, (http://www.uddi.org/).
"UDDI Version 3.0.1", UDDI Spec Technical Committee Specification, Oct. 14, 2003, pp. 1-383, uddi.org, (http://www.uddi.org/).
"UDDI Technical White Paper," Sep. 6, 2000, pp. 1-12, uddi-org, (http://www.uddi.org/).
Wang B., "Priority and realtime data transfer over the best-effort Internet", Dissertation Abstract, 2005, ScholarWorks@UMASS.
Wikipedia, "Diameter (protocol)", pp. 1-11, last accessed Oct. 27, 2010, (http://en.wikipedia.org/wiki/Diameter_(protocol)).
Woo T.Y.C., "A Modular Approach to Packet Classification: Algorithms and Results", Bell Laboratories, Lucent Technologies, Mar. 2000, pp. 1-10.
"The AFS File System in Distributed Computing Environment," www.transarc.ibm.com/Library/whitepapers/AFS/afsoverview.html, last accessed on Dec. 20, 2002.
Aguilera, Marcos K. et al., "Improving recoverability in multi-tier storage systems," International Conference on Dependable Systems and Networks (DSN-2007), Jun. 2007, 10 pages, Edinburgh, Scotland.
Anderson, Darrell C. et al., "Interposed Request Routing for Scalable Network Storage," ACM Transactions on Computer Systems 20(1): (Feb. 2002), pp. 1-24.
Anderson et al., "Serverless Network File System," in the 15th Symposium on Operating Systems Principles, Dec. 1995, Association for Computing Machinery, Inc.
Anonymous, "How DFS Works: Remote File Systems," Distributed File System (DFSs) Technical Reference, retrieved from the Internet on Feb. 13, 2009: URL<:http://technetmicrosoft.com/en-us/library/cc782417WS.10,printer).aspx> (Mar. 2003).
Apple, Inc., "Mac OS X Tiger Keynote Intro. Part 2," Jun. 2004, www.youtube.com <http://www.youtube.com/watch?v=zSBJwEmRJbY>, p. 1.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.
"A Storage Architecture Guide," Second Edition, 2001, Auspex Systems, Inc., www.auspex.com, last accessed on Dec. 30, 2002.
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Botzum, Keys, "Single Sign on—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the-Eleventh IEEE Symposium on Mass Storage Systems, Oct. 1991, pp. 123-128.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, technical report No. UCSC-CRL-92-09 of the Computer & Information Sciences Department of University of California at Santa Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Microsoft Corporation, Nov. 2002.

"CSA Persistent File System Technology," A White Paper, Jan. 1, 1999, p. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072120509.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring Compcon, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT/US02/00720, Jul. 8, 2004.

International Search Report from International Application No. PCT/US03/41202, mailed Sep. 15, 2005.

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13Th LISA Conf, 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., Response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Long et al., "Swift/RAID: A distributed RAID System", Computing Systems, Summer 1994, vol. 7, pp. 333-359.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Novotny et al., "An Online Credential Repository for the Grid: MyProxy," 2001, pp. 1-8.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm of the ACM, Jun. 1990, pp. 1-4, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21, 2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph-p. 868, col. 1, paragraph 1.

Rsync, "Welcome to the RSYNC Web Pages," Retrieved from the Internet URL: http://samba.anu.edu.ut.rsync/. (Retrieved on Dec. 18, 2009).

Savage, et al., "AFRAID—A Frequently Redundant Array of Independent Disks," Jan. 22-26, 1996, pp. 1-13, USENIX Technical Conference, San Diego, California.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

Soltis et al., "The Global File System," Sep. 17-19, 1996, in Proceedings of the Fifth NASA Goddard Space Flight Center Conference on Mass Storage Systems and Technologies, College Park, Maryland.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, pp. 1-4, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Tulloch, Mitch, "Microsoft Encyclopedia of Security," 2003, pp. 218, 300-301, Microsoft Press, Redmond, Washington.

Uesugi, H., Nov. 26, 2008 amendment filed by Japanese associate in response to office action dated May 26, 2008 in corresponding Japanese patent application No. 2002556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

Wilkes, J., et al., "The HP AutoRAID Hierarchical Storage System," Feb. 1996, vol. 14, No. 1, ACM Transactions on Computer Systems.

"Windows Clustering Technologies—An Overview," Nov. 2001, Microsoft Corp., www.microsoft.com, last accessed on Dec. 20, 2002.

Zayas, E., "AFS-3 Programmer's Reference: Architectural Overview," Transarc Corp., version 1.0 of Sep. 2, 1991, doc. No. FS-00-D160.

* cited by examiner

SYSTEM AND METHOD OF ALGORITHMICALLY GENERATING A SERVER SIDE TRANSACTION IDENTIFIER

FIELD

The present disclosure is generally directed to a system and method of algorithmically generating a server side transaction identifier and replicating the same among one or more virtualization devices.

BACKGROUND

In a file system virtualization environment, a Network File System (NFS) protocol assigns a unique Transaction ID (XID) to each requested operation from a client device to a file server device. The XID is generated by the client device when issuing the request, whereby the XID is returned by the server in the server response to the client device. An application layer gateway device is utilized to multiplex requests between multiple clients and one or more file servers, whereby the gateway maps the XIDs received from the client devices into new, unique Transaction ID (XID') values before forwarding the client devices' requests to the server(s). The gateway device must save the mapping information between the client device and the XID by using the identity of the client device (i.e. its network address) and XID. Further, the gateway device must also map its created XID' to the client device. When the server returns a response with the XID', the gateway device maps the received XID' back to the originating client identity and XID. Therefore, the gateway device must save and retrieve the original XID included in the client device's request to be able to include it in the server response that is ultimately sent back to the client device. Accordingly, the gateway device must store corresponding XID/XID' entries for every operation in progress in a mapping table.

Further, some protocols, including the NFS protocol, use the XID information to identify operations that are duplicates of prior operations that are being retried due to timeouts or other errors. The application gateway device must therefore map a retransmitted operation for a client device's XID to the same XID' used the first time the operation was proxied by the gateway device. This ensures the server detects this request as a retransmitted request instead of a new request. Considering that the gateway device must store the XID/XID' information for every operation in a mapping table, and that client devices are capable of sending thousands of requests per second, the mapping table used by the gateway device can easily grow to millions of entries. Further, if the gateway device utilizes a backup gateway device, the mapping table must also be stored in a shared memory and replicated in the backup gateway device so that the backup device can seamlessly handle communications in case the active gateway device goes off-line. This current implementation imposes a significant burden on the active and backup gateway devices.

What is needed is a file virtualization device which algorithmically generates a server side transaction identifier (XID') and replicates the algorithm among one or more virtualization devices without requiring the needed amount of substantial storage space to store XID/XID' mapping information.

SUMMARY

In an aspect, a method of generating a server side transaction ID (XID') is disclosed. The method comprises receiving, at a file virtualization device, a request from a client device to access a server, wherein the request includes a source port, source IP address, protocol information and a client generated transaction ID (XID). The method comprises determining an endian'ness of the client. The method comprises generating a Client ID for the client request, the Client ID utilizing the source port, source IP address, protocol information, and a Masked XID generated from the endian'ness determination and the XID. The method comprises synthesizing a server side transaction ID (XID') by combining the Client ID and an XID halfword containing least significant bits (LSB) identified from the endian'ness determination. The method comprises transmitting the XID' to the file server, wherein the XID' is associated with the XID for the corresponding client request.

In another aspect, a non-transitory computer readable medium having stored thereon instructions for generating a server side transaction ID (XID') is disclosed. The medium comprises machine executable code, which when executed by at least one machine, causes the machine to receive a request from a client device to access a server. The request includes a source port, source IP address, protocol information and a client generated transaction ID (XID). The code causes the machine to determine an endian'ness of the client. The code causes the machine to generate a Client ID unique to the client request, wherein the Client ID utilizes the source port, source IP address, protocol information, and a Masked XID generated from the endian'ness determination and the XID. The code causes the machine to synthesize a server side transaction ID (XID') by combining the Client ID and an XID halfword containing least significant bits (LSB) identified from the endian'ness determination. The code causes the machine to transmit the XID' to the file server, wherein the XID' is associated with the XID for the corresponding client request.

In an aspect, a file virtualization device comprises a network interface that is configured to receive client requests and transmit the client requests to one or more file servers. The file virtualization device comprises a memory configured to store programming instructions in executable code for generating a server side transaction ID (XID'). The file virtualization device comprises a processor that is configured execute the code, which causes the processor to receive a request from a client device to access a server. The request includes a source port, source IP address, protocol information and a client generated transaction ID (XID). The processor is further configured to determine an endian'ness of the client. The processor is further configured to generate a Client ID that is unique to the client request which utilizes the source port, source IP address, protocol information, and a Masked XID generated from the endian'ness determination and the XID. The processor is further configured to synthesize a server side transaction ID (XID') by combining the Client ID and a XID halfword containing least significant bits (LSB) identified from the endian'ness determination. The processor is further configured to transmit the XID' to the file server, wherein the XID' is associated with the XID for the corresponding client request.

In one or more of the above aspects, the generated Client ID is stored as a new entry in a Client ID Table, wherein at least a portion of the Client ID Table is replicated to at least one other processor in the file virtualization device and/or another file virtualization device.

In one or more of the above aspects, the endian'ness of the client is identified as having a Big Endian format, a Little Endian format, an Unknown format or a Random format. The identified endian'ness is then stored in a Classification table in memory. In the case that the endian'ness is classified as having the Random format, a first XID halfword is converted to a zero bit value in generating the Client ID.

In one or more of the above aspects, endian'ness is determined by first receiving and storing a plurality of XIDs from the client for a set number of client requests. A plurality of upper halfwords are then compared to identify a number of changed halfwords among adjacent upper halfwords in the set. An entropy classification is then designated to the upper halfwords based on the number of identified changed halfwords among upper halfwords. A plurality of lower halfwords are then compared to identify a number of changed halfwords among adjacent lower halfwords in the set. An entropy classification is then designated to the lower halfwords based on the number of identified changed halfwords among lower halfwords. An XID classification is then assigned to the client based on the entropy classifications designated to the upper and lower halfwords.

DETAILED DESCRIPTION

In general, the present disclosure is directed to a system and method which algorithmically generates a server side transaction ID (XID') using a client generated transaction ID (XID). In particular, a generator module within a file virtualization device receives a client request for access to one or more file servers, wherein the client request contains the XID. The generator module determines the endian'ness classification of the client and generates a Masked XID from the classification information and the client XID itself. The generator module thereafter extracts the source IP address, source port and protocol information from the client request and combines it with the Masked ID to generate a Client ID and a corresponding search key unique to the client-server transaction. The Client ID is stored in a Client ID Table. The generator module then combines the Client ID with the least significant bit portion of the client XID to synthesize the server side XID'. The file virtualization device transmits the XID' along with its address information to the one or more requested file servers. The file virtualization device is also configured to share replicated copies of the Client ID Table and other transaction data to other cores in the same and/or other file virtualization devices.

Advantages of the present system and method are that they reduce the data and communication overhead associated with storing and sharing XID/XID' mapping information. In particular, the present system and method stores and replicates entries in the Client ID Table instead of a complete XID/XID' mapping table. The present system optimizes DRC update message exchanges between cores within or exterior to the active core by only synchronizing elements of the Client ID Table. At this reduced message rate, the DRC updates in a file virtualization device can be saved to network accessible storage instead of having to be sent to a backup file virtualization device. This eliminates the requirement for the backup file virtualization device to locally save copies of the DRC updates.

Figure 1A:
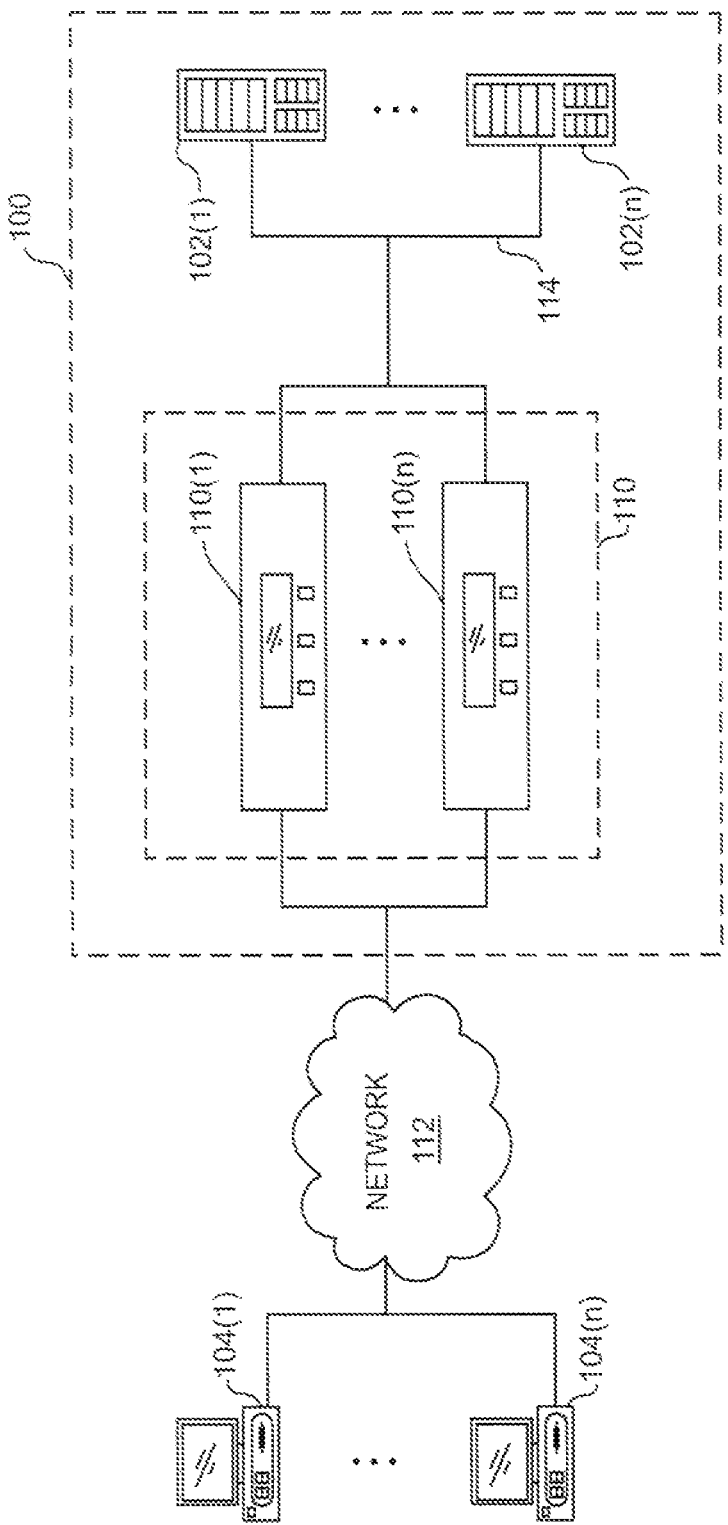
FIG. 1A is an example of system including one or more file virtualization devices in accordance with an aspect of the present disclosure.

FIG. 1A is an example of a network environment including one or more file virtualization systems in accordance with an aspect of the present disclosure. As shown in FIG. 1A, the network environment includes one or more server devices 102(1)-102(n), one or more client devices 104(1)-104(n), and one or more data center sites 100. The data center site 100 within the environment comprises a network connection via network 112 between the file virtualization devices 110(1)-110(n) and client devices 104(1)-104(n) a secured or unsecured connection via LAN 114 between one or more file virtualization devices 110(1)-110(n) and the servers 102(1)-102(n). The ellipses and the designation "n" in the figures denote an unlimited number of file server devices, file virtualization devices, and/or client devices. It should be noted that although only one data center site 100 is shown in FIG. 1A, more than one backup data center sites (not shown) may be employed in the environment.

For purposes of discussion, the file virtualization system 110, when in an active state, hosts active services and operates to execute various virtualization services between client devices and virtual file servers. In particular to the present disclosure, the one or more of the file virtualization devices 110(1)-110(n) are configured to perform an algorithmic process to generate a server side XID' between the file virtualization devices 110(1)-110(n) and the file servers 102(1)-102 (n).

In this example, the network 112 comprises a publicly accessible network, for example, the Internet. Communications, such as read and write requests between client devices 104(1)-104(n) and file server devices 102(1)-102(n) take place over the network 112 according to standard network protocols, such as the HTTP, TCP/IP, request for comments (RFC) protocols, Common Internet File System (CIFS) protocols, Network File System (NFS) protocols and the like.

Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent between network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

LAN 114 includes a private local area network that allows communications between the file virtualization devices 110 (1)-110(n) and one or more file server devices 102(1)-102(n), although the LAN 114 may comprise other types of private and public networks with other devices.

File server devices 102(1)-102(n) are capable of performing operations such as, for example, storing files and data in a file system. In an aspect, file server devices 102(1)-102(n) are accessed by client devices 104(1)-104(n) via the file virtualization system 110. In FIG. 1A, although two file server devices 102(1)-102(n) are shown it should be understood that any number of file server devices, including one, can be used. In an aspect, file server devices 102(1)-102(n) can be heterogeneous devices provided by different independent manufacturers. Further, according to various examples, file server devices 102(1)-102(n) can be used to form a tiered storage arrangement in which high priority data and/or frequently accessed data is stored in fast, more expensive file server devices and low priority and/or relatively less accessed data can be stored in slower, less expensive file server devices. A series of applications run on the file server devices 102(1)-102(n) that allow the transmission of data, cookies, descriptor files, namespace data, and other file system data. The file server devices 102(1)-102(n) can provide data or receive data in response to requests from the client devices 104(1)-104(n). In an aspect, file server devices 102(1)-102(n) may store and/or provide other data representative of requested resources, such as particular Web page(s), image(s) of physical objects, and any other objects.

As shown in FIG. 1A, client devices 104(1)-104(n) communicate with the file server devices 102(1)-102(n) via the file virtualization device 110, whereby the client devices 104(1)-104(n) make requests to retrieve as well as send data to the file server devices 102(1)-102(n) via the network 112. Generally, client devices 104(1)-104(n) can include virtually any network device capable of connecting to another network device to send and receive information, including Web-based information. The set of such devices can include devices that typically connect using a wired (and/or wireless) communications medium, such as personal computers (e.g., desktops, laptops, tablets), smart TVs, stand alone multimedia boxes, mobile and/or smart phones and the like.

Each of the file server devices 102(1)-102(n), file virtualization devices 110(1)-110(n), and client devices 104(1)-104(n) can include a central processing unit (CPU), controller or processor, a memory, and an interface system which are coupled together by a bus or other link, although other numbers and types of each of the components and other configurations and locations for the components can be used.

Generally, the file virtualization devices 110(1)-110(n) in the file virtualization system 110 simplify storage management and lower total storage management costs. In an aspect, the file virtualization devices 110(1)-110(n) automate data management tasks and eliminate the disruption associated with storage management operations. The file virtualization system 110 provides a virtual layer of intelligence between the network 112 and the respective file server devices 102(1)-102(n). The file virtualization system 110 thus eliminates the inflexible mapping which typically ties client devices to physical file server devices. The file virtualization system 110(1)-110(n) decouples the logical access to files from their physical location, so files are free to move among different file server devices, which are now free to change without disrupting users, applications, or administrators. The file virtualization devices 110(1)-110(n) implement intelligent file virtualization that simplifies data management further by providing automated, policy-based management across heterogeneous storage environments.

An example file virtualization device can be the ARX® Series devices provided by F5 networks, Inc. of Seattle, Wash. The file virtualization device can be configured to plug directly into existing IP/Ethernet network 112 and/or LAN 114, in substantial real-time. The file virtualization devices 110(1)-110(n) are configured to virtualize heterogeneous file server devices 102(1)-102(n) that present file systems via NFS and/or CIFS, for example.

In an example, the file virtualization devices 110(1)-110(n) do not connect directly to a storage area network (SAN) but instead manages SAN data presented through a gateway or file server device, without changing the existing infrastructure of the system 100. The file virtualization devices 110(1)-110(n) appear as a single gateway device to client devices 104(1)-104(n), and as a single CIFS or NFS client to their respective file server devices. In an aspect, the file virtualization devices can be configured to carry out data management operations, although the file virtualization devices can additionally or alternative carry out storage management operations.

For example, the file virtualization devices 110(1)-110(n) may be configured to automate common storage management tasks (e.g., data migration, storage tiering, and/or load balancing), which take place without affecting access to the file data or requiring re-configuration of file system(s) on client devices 104(1)-104(n). The file virtualization devices 110(1)-110(n) manage metadata that tracks the location of files and directories that are distributed across file server devices 102(1)-102(n), which is stored in configuration data. The file virtualization devices 110(1)-110(n) use the configuration data to utilize namespace data, which is an aggregation of the underlying file systems, and as well as masked changes to the underlying storage systems from users and applications of client devices 104(1)-104(n).

Figure 1B:
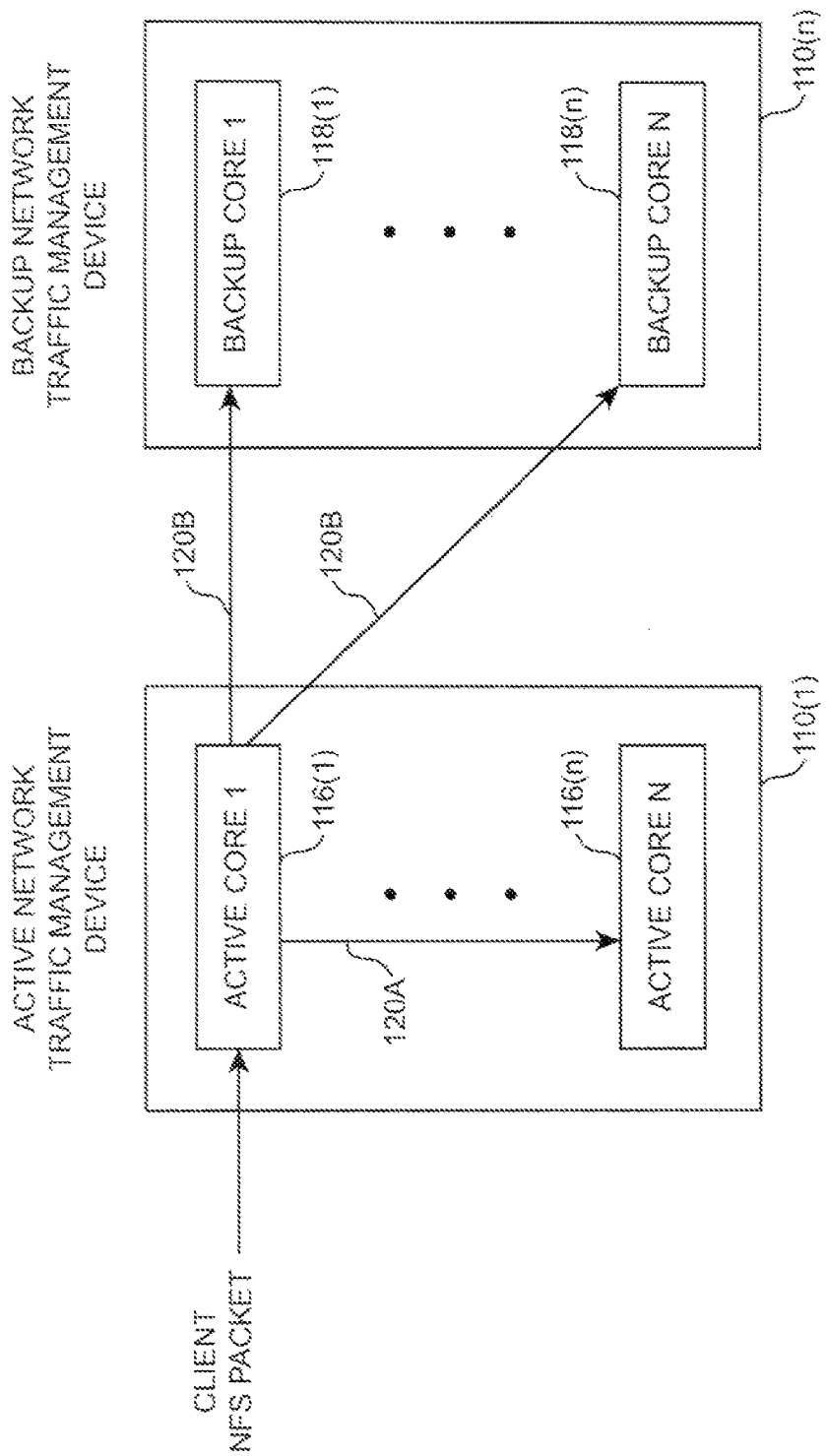
FIG. 1B is a block diagram of a relational operation in association with one or more file virtualization devices in accordance with an aspect of the present disclosure.

Along with generating XID'(s), file virtualization devices 110(1)-110(n) of the active file virtualization system 110 continually replicate client ID information among multiple cores 116(1)-116(n) within a single file virtualization device 110(1), as shown by arrow 120A (FIG. 1B). In particular to FIG. 1B, network traffic management device 110(1) may include 'n' number of cores 116, whereby client ID information may be replicated from the active core 116(1) to one or more other cores 116(n) within the active network traffic management device 110(1) and/or within one or more cores 118(1)-118(n) in one or more backup file virtualization devices 110(n) in the same data center and/or in another data center. In an aspect, Client ID information is replicated to one or more file systems separate from the file virtualization devices 110, whereby the file systems can provide the Client ID information to any core in any file virtualization device.

In an aspect, the client ID data is synchronously exported from one or more active file virtualization devices to one or more backup file virtualization devices. In a particular aspect, the Client ID data is exported from one or more active cores in a file virtualization device to one or more backup cores within itself or inside other file virtualization devices. The non-active file virtualization device(s) and/or cores, upon receiving the imported Client ID data, will store the Client ID data in a memory associated with that file virtualization device. In an aspect, the replicated Client ID data is stored in a storage device exterior to the file virtualization devices 110(1)-110(n). The backup virtualization device and/or core becomes operational when the active virtualization device fails and/or if one or more file server devices 102(1)-102(n) fail. The failure can occur as a result of a catastrophic disaster, equipment breakdown, or equipment/software upgrade.

Figure 1C:
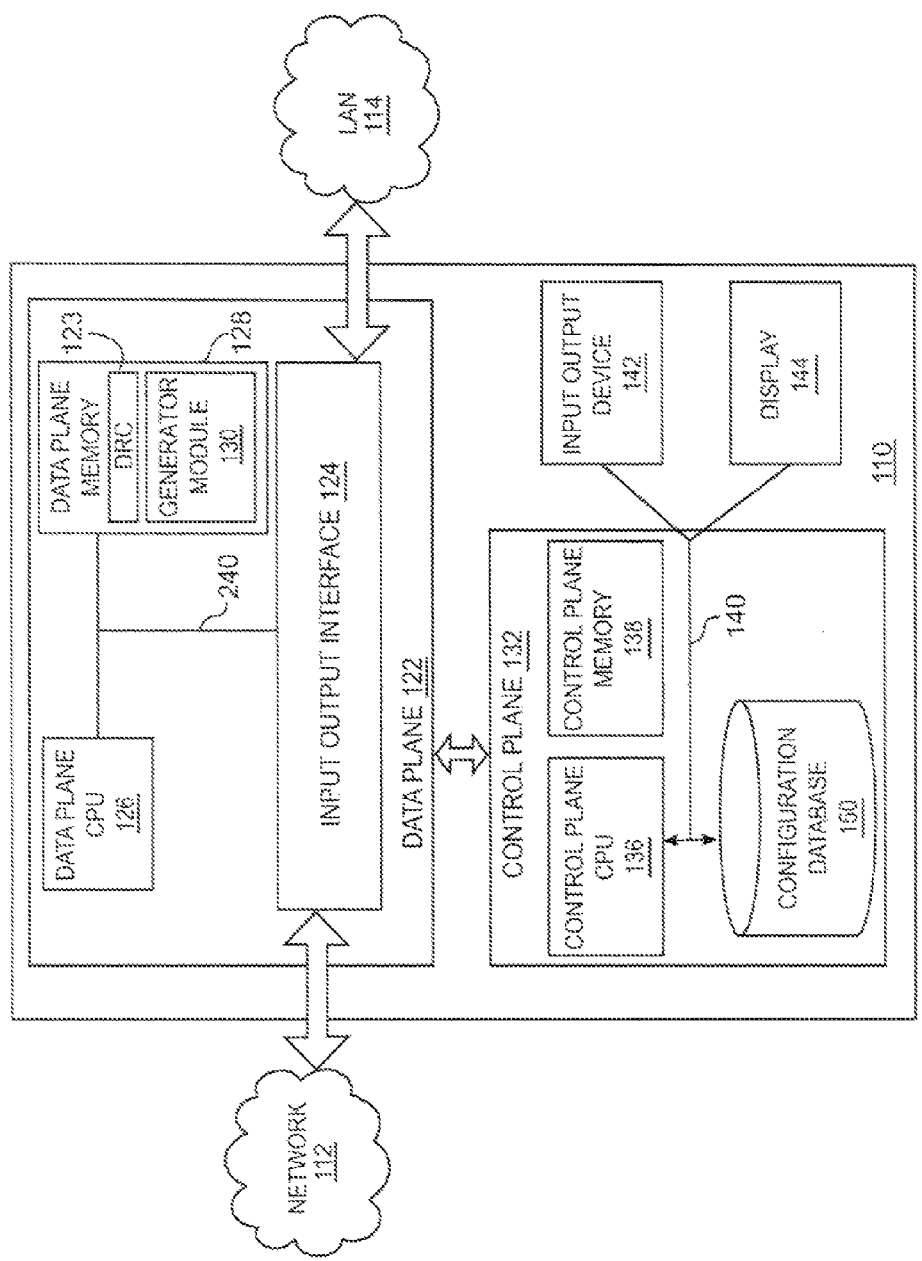
FIG. 1C is a block diagram of a file virtualization device including a generator module in accordance with an aspect of the present disclosure.

FIG. 1C is a block diagram of an example file virtualization device in accordance with an aspect of the present disclosure. As shown in FIG. 1C, the file virtualization device 110 includes one or more data planes 122, one or more control planes 132, one or more input-output devices 142 and one or more displays 144. It should be noted that the illustrated example file virtualization device 110 may include additional, fewer and/or different hardware modules.

The network input-output interface 124 is configured to allow the file virtualization device 110 to communicate with other network devices, such as one or more other file virtualization devices, via any network protocol such as TCP or UDP.

Input-output device 142 may in some examples connect to multiple input-output devices external to file virtualization device 110. Some examples of the input-output device 142 may be configured to provide storage or an installation medium, while others may provide a universal serial bus (USB) interface for receiving USB file server devices such as the USB Flash Drive. Still other examples of the input-output device 142 may be a bridge between the bus 130 (in data and/or control plane) and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In an aspect, the data plane 122 of the file virtualization device 110 functions to provide a data path that handles non-metadata operations at wire speed. The control plane 132 of the file virtualization device 110 functions to provide handling of operations that affect metadata and migration of file data to and from file server devices 102(1)-102(n). In an aspect, the control plane 132 is configured to perform certain functions such as logging, reporting, port mirroring, and hosting Simple Network Management Protocol (SNMP) and other protocols. Control plane memory 138 can store an operating system used for file virtualization device 110, and log files generated during operation of file virtualization device 110. Each path provided by data plane 122 and control plane 132, respectively, has dedicated processing and memory resources and each can scale independently based upon varying network and storage conditions.

In this example shown in FIG. 1B, the data plane 122 includes one or more data plane processors (CPU) 126, one or more data plane memories 128, and one or more input-output interfaces 124 coupled to each other through one or more internal data plane bus 130.

Similarly, in this example, the control plane 132 includes one or more control plane processors (CPU) 136, one or more control plane memories 138 and one or more configuration databases 150, all coupled to one another via internal control plane bus.

The configuration database 150 is configured to store object relationships of the configuration data and mapping information between the various objects in the file system managed by file virtualization device 110. Additionally, as shown in FIG. 1B, the control plane 132 is able to communicate with the input-output device 142 and the display 144 via the internal control plane bus 130.

Data plane CPU 126 and control plane CPU 136 are configured to process instructions fetched from the data plane memory 128; one or more microprocessor units, one or more microprocessors, one or more microcontrollers, and central processing units with a single processing core or a plurality of processing cores 116, 118.

The data plane memory 128 and the control plane memory 138, can comprise: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), disk type memory, tape memory, spinning storage media, or any other type of memory device capable of executing the systems and methods described herein.

As shown in FIG. 1C, the data plane memory 128 includes a generator module 130 which includes non-transitory software code which, when executed by processor or CPU 126, causes the CPU 126 to perform the novel functions described below. Although the generator module 130 is shown in memory 128, it is contemplated that module 130 may be located elsewhere within or exterior to memory 128.

The system and method of the present disclosure utilizes a novel concept based on the observation that each client device does not generate a random XID, but instead utilizes an internal XID generator that operates in conjunction with a counter. Thus, for each client generated XID, only the least significant bits (LSB) of the XID actually change among multiple requests sent from the client device. Thus, the most significant bits (MSB) of the XID 306 do not typically change among multiple requests, unless a wraparound occurs (discussed below).

In general, the generation module 130 synthesizes a unique Client ID 308 from the client IP address 300, transport protocol 302, source port 304, and a generated Masked XID 314 which is determined from the XID classification 312 and the client XID 306. The generator module 130 concatenates the client ID 306 with the least significant bits (LSB) of the client's XID to algorithmically generate a XID' 310 which uniquely identifies the client's request. The synthesized client XID' 310 is passed from the file virtualization device 110 to the file server 102. One or more Client IDs are replicated and exported or transmitted to one or more other file virtualization devices 110(n) and/or one or more cores in the file virtualization device 110(1) (i.e. cores 116(1)-116(n)) and/or in the other file virtualization devices 110(n) (i.e. cores 118(1)-118(n)).

Figure 2:
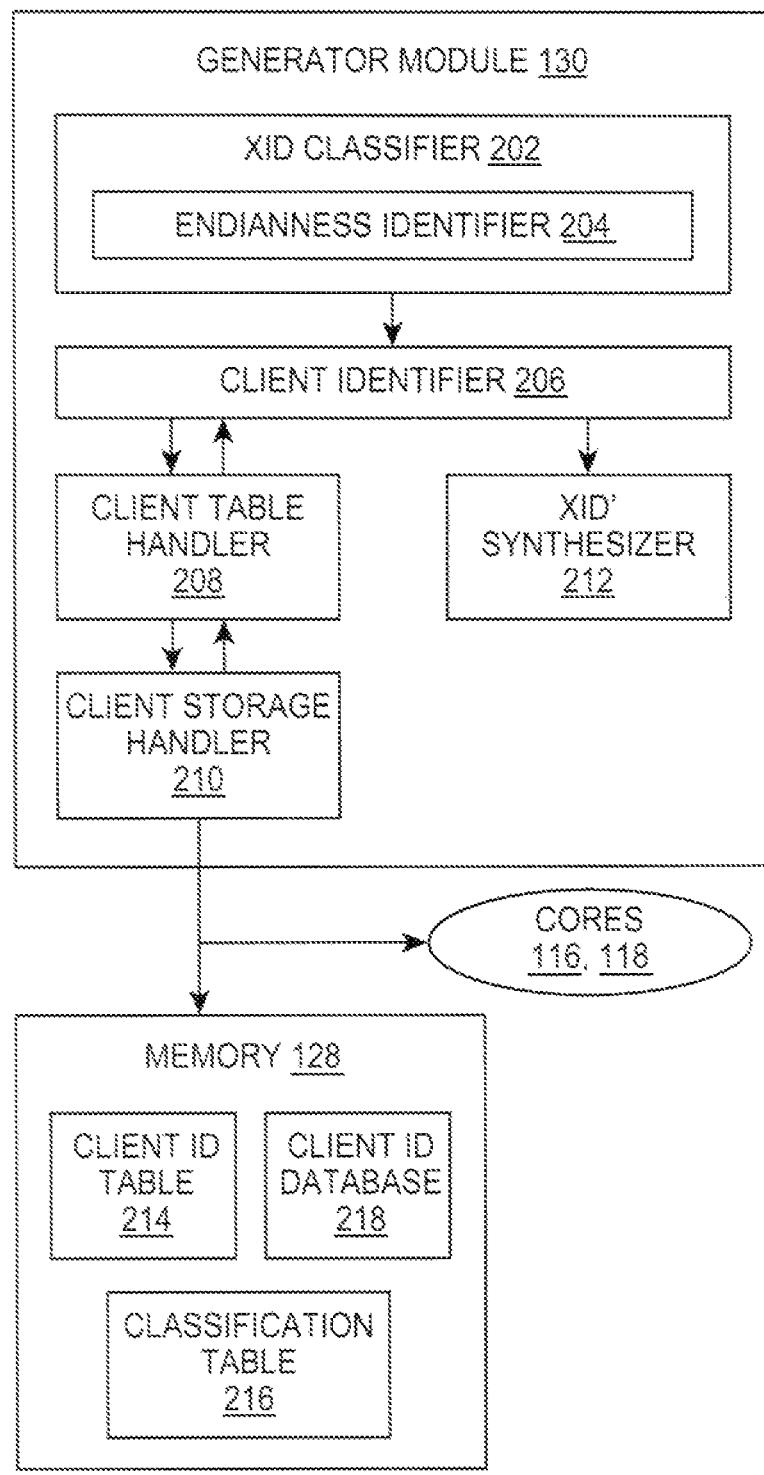
FIG. 2 illustrates a block diagram of the generator module in accordance with an aspect of the present disclosure.
Figure 3:
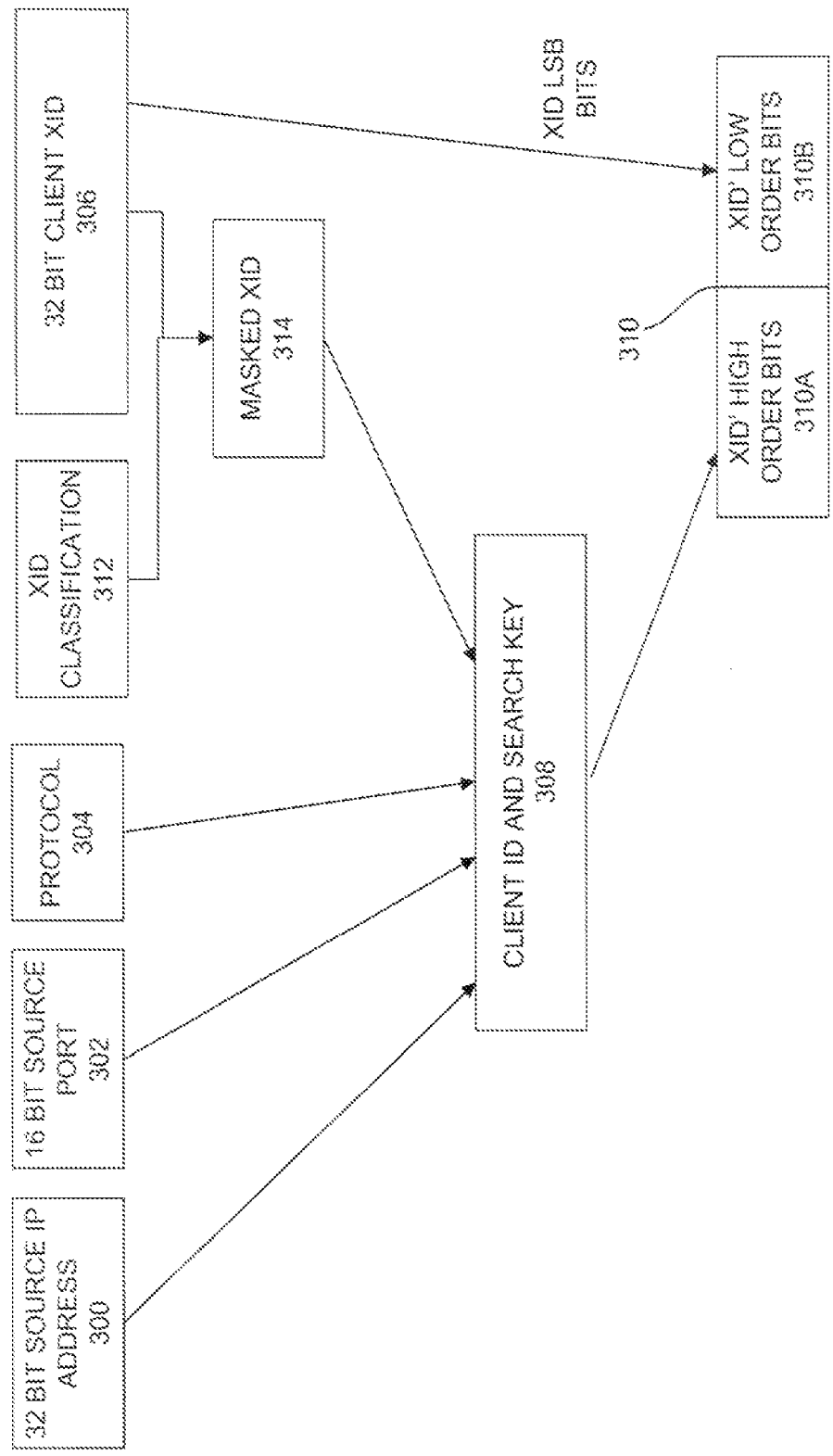
FIG. 3 illustrates a general diagram representative of a overall process performed by the generator module in accordance with an aspect of the present disclosure.

FIG. 2 illustrates a block diagram of the generator module in accordance with an aspect of the present disclosure. FIG. 3 illustrates a general diagram representative of an overall process performed by the generator module in accordance with an aspect of the present disclosure. As shown in FIG. 2, the generator module 130 includes a plurality of software modules such as an XID classifier 202, an endian'ness identifier 204, a client identifier 206, a client table handler 208, a client storage handler 210 and a XID' synthesizer 212. In an aspect, the generator module 130, via the client table handler 208, is configured to store and retrieve information with a Client ID Table 214 in one or more memories 128. In an aspect, the generator module 130, via the client storage handler 210, is configured to store and retrieve information with a Classification Table 216 and/or a Client ID Database 218 in one or more memories 128. It should be noted that the illustrated example generator module 130 may include additional, fewer and/or different software modules.

The XID Classifier 202 is configured to classify XIDs based on the endian'ness of each of the client's received 32-bit XIDs. The endian'ness is determined by the endian'ness identifier 204 and allows the XID Classifier 202 to identify which portion of the XID 306 has the most significant bits (MSB) 306A and the least significant bits (LSB) 306B. The Client Identifier 206 uses a tuple of data from the client request to create a 16 bit Client ID 308 that is unique to the particular transaction associated with the client request. In an aspect, as shown in FIG. 3, the tuple includes the source IP address 300, source port 302, protocol 304, client endian'ness 312, and a Masked XID 314 which is determined from endian'ness XID classification 312 of the client 104. As will be discussed in more detail, the generated Client ID 308 forms the higher order component 310A of the generated XID' 310.

A new Client ID 306 is generated when the requesting client is new (by IP address, protocol, or port) or when the LSB 16 bits of the client's XID halfword has overflowed and changed the MSB halfword of the client's XID (i.e. wraparound). After a Client ID 308 has been generated by the generator module 130, it is stored in the Client ID Table 214. Accordingly, the Client ID Table 214 changes when a newly generated Client ID is entered. In an aspect, at least a portion of the Client ID Table 214 is replicated to one or more cores in the same or other file virtualization devices or in one or more shared file servers/databases in case of a failover. In one aspect, only newly generated Client ID(s) 308, and not the entire Client ID Table 214, are replicated. In another aspect, the entire Client ID Table 214 is replicated.

The Classification Table 216 contains mapping information between the client's IP address 300 and the classified endian'ness of that client 104. The Client ID Database 218 contains a list of issued and available Client IDs per data plane core.

The XID' synthesizer 212 combines the Client ID 308 generated by the client identifier 206 with the 16 lower order LSB bits of the client XID to form the synthesized XID' 310 that is ultimately sent to the file server 102.

Figure 4:
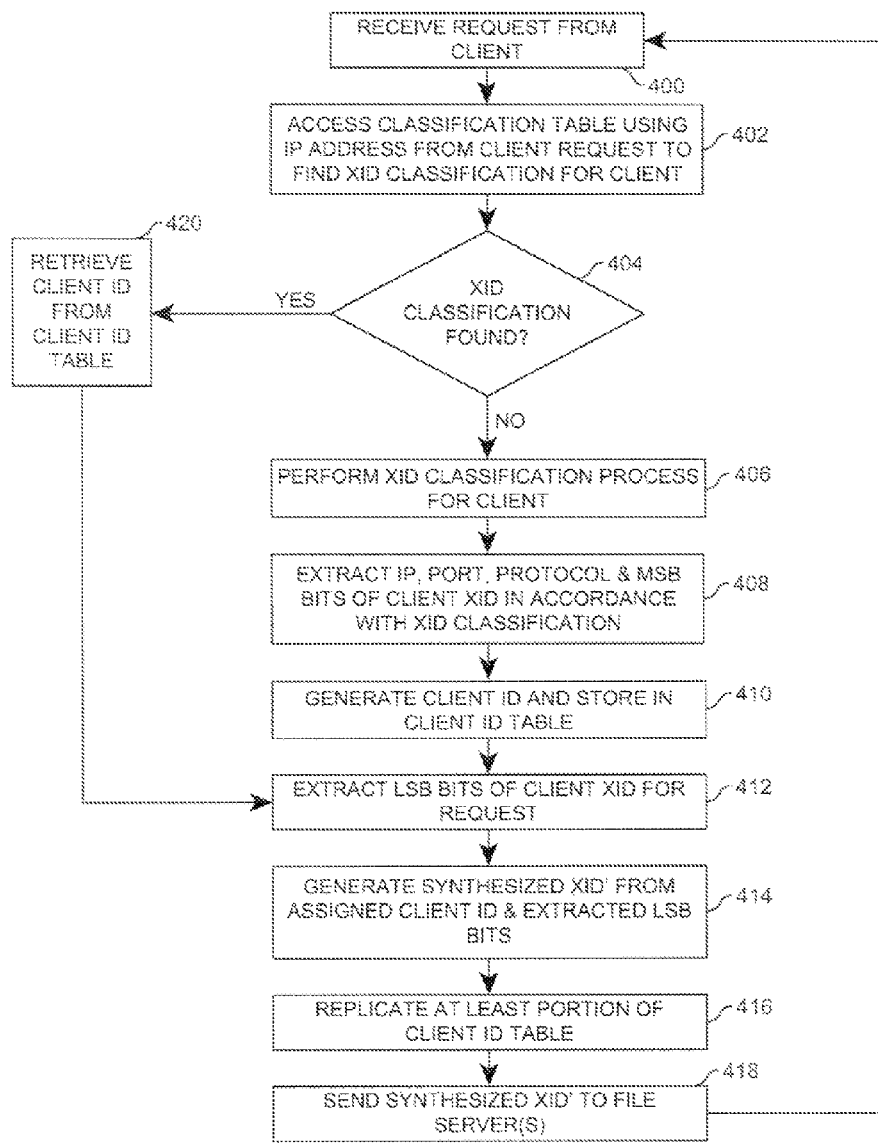
FIG. 4 illustrates a flow chart depicting at least a portion of the XID generating process performed by the generator module in accordance with an aspect of the present disclosure.

FIG. 4 illustrates a flow chart depicting at least a portion of the XID' generating process performed by the generator module in accordance with an aspect of the present disclosure. It should be noted that one or more steps may be performed in a different order with respect to the other steps. It should also be noted that additional or fewer steps are contemplated in the illustrated flow chart.

As shown in FIG. 4, the file virtualization device 110 receives a request from a client 104 over network 112, wherein the client's request for the transaction is to access one or more file servers 102(1)-102(n) (Block 400). In an aspect, the client request is a remote procedure call (RPC) utilizing a Network File System (NFS) protocol (referred to as a "NFS request"), although other types of protocols are contemplated. As partially illustrated in FIG. 3, the client's NFS request includes at least a 32 bit source IP address 300, a 16 bit client source port 302, an 8 bit protocol 304 and a 32 bit client generated XID 306.

After the client request is received, the generator module 130 in general determines whether an XID classification for the client 104 is stored in the Classification Table 216 (Block 402). In particular, the generator module 130 identifies the client 104 by the source IP address 300 and uses it to perform a lookup in the Classification Table 216 to determine the classified XID endian'ness 312 of the client 104. As explained in more detail below, the classified XID endian'ness 312 is used to generate a Masked XID 314.

As shown in Block 404, the generator module 130 inquires whether an entry for the XID classification is found in the Classification Table 216. If there is no XID classification entry in the Classification Table 216, then a new table entry containing a new XID classifier is created in the Classification Table 216 and the generator module 130 initiates a process to classify the client XID (Block 406). In an aspect, the client XID 306 is classified by analyzing the endian'ness of the XID 306 using a novel process described below in FIG. 5. It should be noted, however, that the process described in FIG. 4 may utilize other appropriate methods to classify the XID while remaining enabling.

Once the XID classification of the client 104 is known, the client identifier 204 generates a search key to search the Client ID Table 214 to find the Client ID 308 in the Client ID Table 214 which corresponds to the client's request (Block 408). In particular, the search key includes the source IP address 300, port 302, protocol 304, and a Masked XID 314 which is generated based on the client's XID classification 312. In particular, the Masked XID 314 utilizes two input parameters, the client's XID 306 and the client endian'ness 312. The Masked XID is a full 32-bit word.

Figure 5:
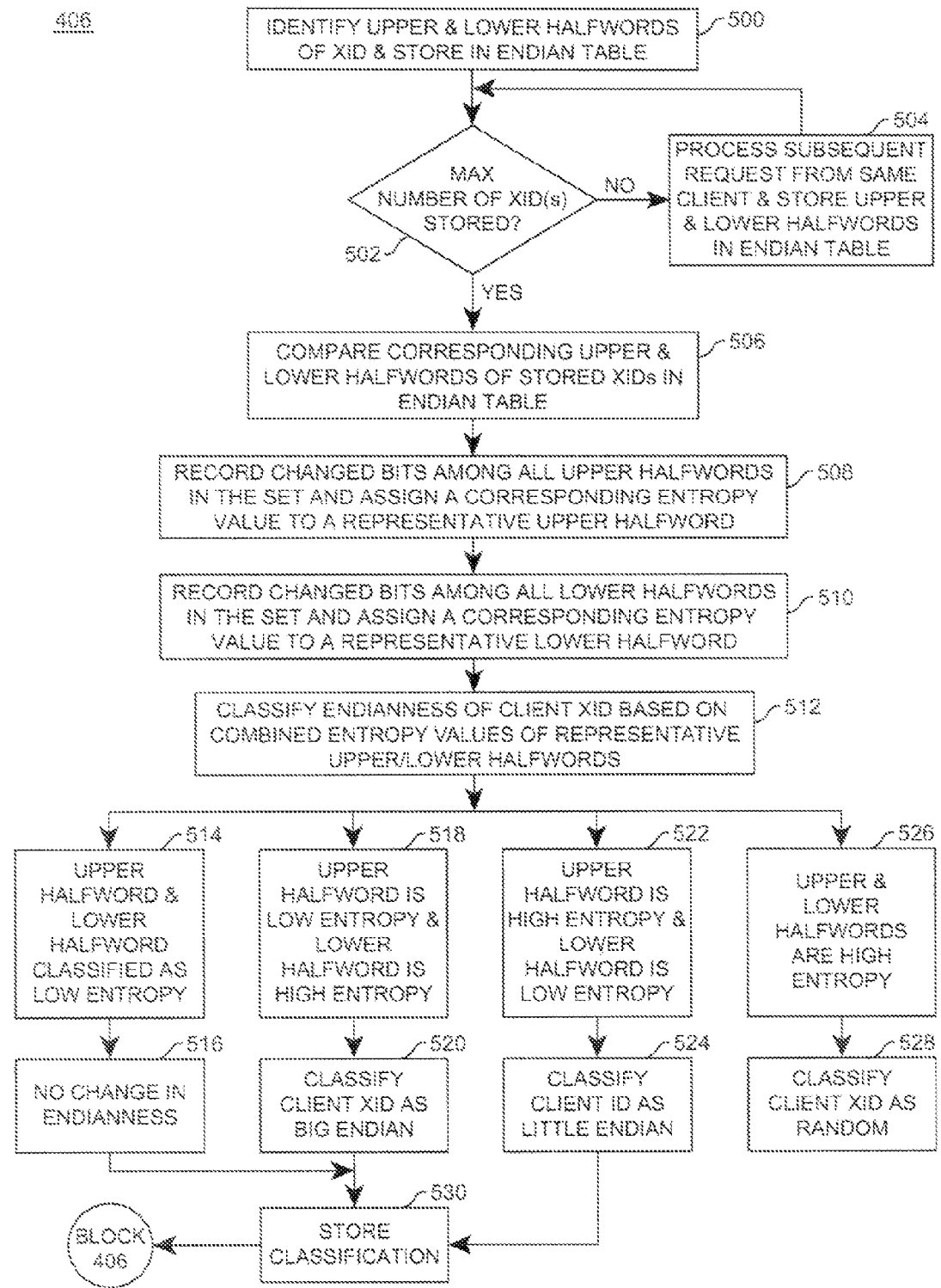
FIG. 5 illustrates a flow chart depicting at least a portion of the endian determination process performed by the generator module in accordance with an aspect of the present disclosure.

The XID classifier 202 is configured to classify the client XID as having a Big Endian format, a Little Endian format, an Unknown format or a Random format using the method described in FIG. 5. If client XID is classified as Little Endian, then the upper 16 bit halfword of the XID 306 is the masked XID that is used to form the search key, and the lower 16 bit halfword of the XID 306 is considered to contain the LSBs which form the lower order halfword of the XID' 310B. In an example aspect, if the XID is classified as Little Endian, then the Masked XID=Client XID & 0xFFFF0000, in which 'FFFF' are non-zero bits.

If the client XID is classified as Big Endian, then the lower 16 bit halfword of the XID 306 is the masked XID that is used to form the search key, and the upper 16 bit halfword of the XID 306 is considered the LSBs which form the lower order halfword of the XID' 310B. In an example aspect, if the XID is classified as Big Endian, then the Masked XID=Client XID & 0x0000FFFF, in which 'FFFF' are non-zero bits.

If the client XID is classified as Unknown, then all 32 bits of the client XID is used as the Masked XID 314. In particular, all 32-bits of the front-end XID are folded into the XID LSBs to capture as much entropy as possible. In an example aspect, if the XID is classified as Unknown, the Masked XID=Client XID & 0xFFFFFFFF, in which 'FFFF' are non-zero bits. In this case the Masked XID is the unmodified client XID and the Client ID Table acts like a XID to XID' mapping table. Since each XID having an Unknown endian'ness creates a new table entry, each XID having an Unknown endian'ness must map to a new XID'. Once the endian'ness is determined then that Masked XID 314 becomes a value like 0x12340000 and that Masked XID 314 value remains constant for any Client XID that begins with 0x1234. In other words, the low 16 bits of the client XID are masked off to form the Masked XID 314.

If the client XID is classified as Random, the Masked XID 314 is given zero bits. Additionally, all 32-bits of the XID 306 are folded into the LSB halfword of the XID to capture as much entropy as possible. Thus, the Client ID 306 includes the client's IP address 300, port 302, protocol 304, and a Masked XID 314 of zero. In an example aspect, if the XID is classified as Random, the Masked XID=Client XID & 0x00000000. The generator module 130 XORs the two halves of the client's XID to form the XID LSBs that are combined with the client ID to form the XID'.

The generator module 130 extracts the 32 bit source IP address 300, the 16 bit source port address 302, the 8 bit protocol information 304, and the Masked XID 306 to create the search key that can be used to locate the assigned Client ID 308 (Block 408). In particular, the generator module 130 maintains this information in the Client ID Table 214 in memory 128 or another storage location. The Client ID Table 214 is configured to store the IP address 300, source port 302, protocol 304, and Masked XID 314 as well as endian'ness XID classification 312 when the entry was created. The Client ID Table 214 stores all of the generated Client IDs 308 in a list to ensure that any new generated Client ID 308 does not have the same identifying bits of an already existing Client ID.

If the Client ID is not found using the search key (Block 410), the generator module 130 will generate a new Client ID using the tuple information and the Masked XID and add the new entry in the Client ID Table 214 (Block 412). The generator module 130 is able to incrementally generate $2^{16}$ or 65,536 Client IDs before a wraparound occurs (i.e. previously issued Client ID are reused). The Client IDs which are available for use are kept in the Client ID database 218. Accordingly, when a new client ID is to be generated for a client request, the next incremental Client ID will be allocated from the Client ID Database 218. In an example event that there is no free Client ID available in the Client ID Database 218, the XID Classifier 202 will identify and reuse the Least Recently Used (LRU) Client ID for the new Client ID entry. The allocated Client ID is then added to the Client ID Table 214 as a new entry in which the new entry is mapped to the tuple (IP address 300, port 302, protocol 304, and Masked XID 314) of the corresponding client request.

Referring back to Block 410, if a Client ID 308 corresponding to the search key is found, the Client ID 308 is retrieved from the Client ID Table (Block 422). As shown in Block 414, the XID' synthesizer 212 of the generator module 130 thereafter extracts the 16 bit LSB halfword of the incoming client XID 306 and concatenates it with the generated Client ID 308 assigned by the client identifier 206 to generate a 32 bit synthesized XID' (Block 414). The synthesized XID' is transmitted in the NFS packet to the file server (Block 416). At least a portion of the Client ID Table 214 is replicated among one or more other cores within the file virtualization device or in one or more other file virtualization devices.

FIG. 5 illustrates a flow chart depicting at least a portion of the endian'ness determination process performed by the generator module in accordance with an aspect of the present disclosure. As shown in FIG. 3, the 32 bit client XID 306 can be divided into two halfwords 306A, 306B. In particular, the higher order halfword 306A is the 16 bit portion which changes infrequently among the client requests, and is therefore referred to herein as the most significant bits portion (MSB). In contrast, the lower order halfword 306B is the 16 bit portion of the client XID which changes with every client request.

As mentioned in FIG. 4, the generator module 130 generates the server side XID' based on correctly identifying which of the MSB and LSB halfwords 306A, 306B are the higher and lower portions. However, not all of the client XIDs are received by the file virtualization device 110 in the same bit or byte order, in which this phenomenon is called endian'ness. For instance, some clients may transmit their XIDs in reverse order (e.g. LSB-MSB) in comparison to other clients' XIDs (e.g. MSB-LSB). For example, a client's XID is classified as having a Big Endian format if the first two bits received over the transmission channel are part of the MSB halfword. In contrast, a client's XID is classified as having a Little Endian format, if the last two bits received over the transmission channel are part of the MSB halfword. In an aspect, the endian'ness identifier 204 compares changed bits among upper halfwords and lower halfwords in their respective sets to determine their entropies.

Advantages are apparent in identifying the endian'ness of the Client XID. For instance, an example aspect may include Client XIDs in which both halfwords change on several or all requests. For this example scenario, the generator module 130 can ensure that wraparounds do not occur too frequently and/or can detect a potential malicious attack and take appropriate action.

As mentioned, clients are identified by the source IP address 300 in which the IP address 300 is used to efficiently lookup the XID classification for that client in the Classification Table 216. In particular, the endian'ness identifier 204 takes the client IP address 300 as well as any other relevant information about the client request and/or client and stores that information along with the Client XID 306 in the Classification Table 216 (Block 500). In an aspect, the endian'ness identifier 204 segments the 32 bit Client XID 306 into a set of upper halfwords and a set of lower halfwords (Block 500). It should be noted that the endian'ness identifier 204 takes the same order of bits for each XID and assigns them to the upper halfword set and lower halfword set for the set number of iterations.

As shown in FIG. 5, the XID Classifier 202 determines whether the set number of stored Client XIDs has been met (Block 502). This is because the endian'ness determination process is performed for a set number of iterations, whereby each iteration is associated with a different request for the same client having a different Client XID value. The number of iterations can be set by the administrator. In an example aspect, the number of iterations can be set to a value of 12, although other values are contemplated. This iterative process allows the XID classifier 202/endian'ness identifier 204 to reevaluate a client's endian'ness each time a new XID value is received for that client.

If the endian'ness identifier 204 in Block 502 determines that the set number of iterations has not yet been met, the endian'ness identifier 204 stores each 16 bit XID halfword in its respective set (e.g. upper or lower set) in the endian'ness table 216 for that iteration (Block 504). The halfwords are stored in the order of their arrival from the client. The process then repeats back to Block 500.

Once the set number of iterations have been reached (and the desired number of that client's upper and lower XID halfwords have been stored), the endian'ness identifier 204 examines the upper and lower halfwords, assigned in their sets, separately to determine whether the bit changes in the upper and lower XID halfwords are frequently changing or not frequently changing between halfwords over the iteration set (Block 506).

The endian'ness identifier 204 compares each of the stored upper halfwords with the next halfword in the set and records the number of changed halfwords. Based on the number of changed halfwords, the endian'ness identifier 204 designates the upper halfword as having a certain entropy at the time of performing the identification process (Block 508). Similarly, based on the number of changed halfwords, the endian'ness identifier 204 designates the lower halfword as having a certain entropy at the time of performing the identification process (Block 510).

In particular to an aspect, the endian'ness identifier 204 will designate a halfword as having high entropy if 8 or more adjacent halfwords were identified to have changed within the stored set of iterations. In contrast, the endian'ness identifier 204 will designate a halfword as having low entropy if less than 4 adjacent halfwords were identified to have changed within the stored set of iterations. Further, the endian'ness identifier 204 will designate that the halfword as having an unknown entropy if 4 to 7 adjacent halfwords had changed within the stored set. It should be noted that the bit value ranges for each of the above described entropies are examples and other bit value ranges are contemplated.

The XID Classifier 202 thereafter analyzes the entropies assigned to the representative upper and lower halfwords and classifies the endian'ness of the XID based on the combined entropy designations (Block 512). As shown in Block 514, the upper halfword has a low entropy and the lower halfword has a low entropy. Based on established classification logic, the XID classifier 202 classifies the endian'ness for the XID to be Unknown (Block 516). As shown in Block 518, the upper halfword has low entropy and the lower halfword has high entropy. Based on established classification logic, the XID classifier 202 classifies the endian'ness for the XID to be Big Endian (Block 520). As shown in Block 522, the upper halfword has high entropy and the lower halfword has low entropy. Based on established classification logic, the XID classifier 202 classifies the endian'ness for the XID to be Little Endian (Block 524).

In an aspect, if both of the upper and lower halfwords are determined by the endian'ness identifier 204 to have high entropy (Block 526), the XID classifier 202 classifies the endian'ness for the XID to be Random (Block 528). In the case that the endian'ness is Random, the MSB halfword is given a value of zero, thereby reducing the entropy of the client's XID to only 16 bits.

After the endian'ness of the XID 306 is determined, the classification for the client's XID 306 is stored in the Classification Table 216. The process thereafter returns to Block 404 in FIG. 4 as the XID classification information is determined.

In an aspect, the current XID classification may be used to select the MSB halfword of the XID as the Client ID Table search key. In this scenario, the classification is changed from Unknown to some other classification after enough XIDs have been received and analyzed by the endian'ness identifier 204. This should be noted as the previous Unknown classification was used by the XID classifier 202 to create the initial entry of the client in the Client ID Table 214.

In an aspect, one or more previous XID classifications are stored in the Classification Table 216. This is to address the potential scenario where the client's endian'ness changes from one endian'ness to another. The typical scenario for changing a client's endian'ness occurs when a client's endian'ness changes from Unknown to either Big, Little, or Random endian'ness after the client endian'ness is classified by the Endian'ness Classifier. If the previous endian'ness is different from the current endian'ness then that previous endian'ness must be used first when creating a search key to look up a client ID in the client ID table. If a search of the table fails to find a match then the current endian'ness must be used. As an optimization, the previous endian'ness can be set to the value of the current endian'ness after a timeout to avoid searching the client ID table twice. This allows the generator module 130 to find a Client ID that may have been stored in the Table 214 under a previous XID classification.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order.

What is claimed is:

1. A method of generating a server side transaction ID (XID'), the method comprising:
   receiving, at a file virtualization device, a request from a client device to access a server, wherein the request includes a source port, source IP address, protocol information and a client generated transaction ID (XID);
   determining an endian'ness of the client;
   generating a Client ID for the client request, the Client ID utilizing the source port, source IP address, protocol information, and a Masked XID generated from the endian'ness determination and the XID;
   synthesizing a server side transaction ID (XID') by combining the Client ID and a XID halfword containing least significant bits (LSB) identified from the endian'ness determination; and
   transmitting the XID' to the file server, wherein the XID' is associated with the XID for the corresponding client request.

2. The method of claim 1, further comprising storing the generated Client ID as a new entry in a Client ID Table and replicating at least a portion of the Client ID Table to at least one other core in the file virtualization device.

3. The method of claim 1, further comprising storing the generated Client ID as a new entry in a Client ID Table and replicating at least a portion of the Client ID Table to at least one other core in another file virtualization device.

4. The method of claim 1, further comprising:
   classifying the endianness of the client as having a Big Endian format, a Little Endian format, an Unknown format or a Random format; and
   storing the classified endian'ness in a Classification table.

5. The method of claim 4, wherein determining the endianness further comprises:
   receiving and storing a plurality of XIDs from the client for a set number of client requests;
   comparing a plurality of upper halfwords to identify a number of changed halfwords among adjacent upper halfwords in the set;
   designating an entropy classification to the upper halfwords based on the number of identified changed halfwords among upper halfwords;
   comparing a plurality of lower halfwords to identify a number of changed halfwords among adjacent lower halfwords in the set;
   designating an entropy classification to the lower halfwords based on the number of identified changed halfwords among lower halfwords; and
   assigning an XID classification to the client based on the entropy classifications designated to the upper and lower halfwords.

6. The method of claim 4, wherein the endian'ness is classified as having the Random format, the method further comprising:
   converting the first XID halfword to a zero bit value;
   generating the Client ID with the converted first XID halfword.

7. A non-transitory computer readable medium having stored thereon instructions for generating a server side transaction ID (XID'), the medium comprising machine executable code, which when executed by at least one machine, causes the machine to:

receive a request from a client device to access a server, wherein the request includes a source port, source IP address, protocol information and a client generated transaction ID (XID);

determine an endian'ness of the client;

generate a Client ID unique to the client request, the Client ID utilizing the source port, source IP address, protocol information, and a Masked XID generated from the endian'ness determination and the XID;

synthesize a server side transaction ID (XID') by combining the Client ID and a XID halfword containing least significant bits (LSB) identified from the endian'ness determination; and transmit the XID' to the file server, wherein the XID' is associated with the XID for the corresponding client request.

8. The computer readable medium of claim 7, wherein the machine is further configured to store the generated Client ID as a new entry in a Client ID Table and replicate at least a portion of the Client ID Table to at least one other machine in the file virtualization device.

9. The computer readable medium of claim 7, wherein the machine is further configured to store the generated Client ID as a new entry in a Client ID Table and replicate at least a portion of the Client ID Table to at least one other machine in another file virtualization device.

10. The computer readable medium of claim 7, wherein the machine is further configured to:
classify the endianness of the client as having a Big Endian format, a Little Endian format, an Unknown format or a Random format; and
store the classified endian'ness in a Classification table.

11. The computer readable medium of claim 10, wherein the machine, when determining the endianness, is further configured to:
receive and store a plurality of XIDs from the client for a set number of client requests;
compare a plurality of upper halfwords to identify a number of changed halfwords among adjacent upper halfwords in the set;
designate an entropy classification to the upper halfwords based on the number of identified changed halfwords among upper halfwords;
compare a plurality of lower halfwords to identify a number of changed halfwords among adjacent lower halfwords in the set;
designate an entropy classification to the lower halfwords based on the number of identified changed halfwords among lower halfwords; and
assign an XID classification to the client based on the entropy classifications designated to the upper and lower halfwords.

12. The computer readable medium of claim 7, wherein the endian'ness is classified as having the Random format, the machine is further configured to convert the first XID halfword to a zero bit value and generate the Client ID with the converted first XID halfword.

13. A file virtualization device comprising:
a network interface configured to receive client requests and transmit the client requests to one or more file servers;
a memory configured to store non-transitory machine executable code including programming instructions for generating a server side transaction ID (XID'); and
a processor configured execute the code, which when executed by the processor, causes the processor to:
receive a request from a client device to access a server, wherein the request includes a source port, source IP address, protocol information and a client generated transaction ID (XID);
determine an endian'ness of the client;
generate a Client ID unique to the client request, the Client ID utilizing the source port, source IP address, protocol information, and a Masked XID generated from the endian'ness determination and the XID;
synthesize a server side transaction ID (XID') by combining the Client ID and a XID halfword containing least significant bits (LSB) identified from the endian'ness determination; and
transmit the XID' to the file server, wherein the XID' is associated with the XID for the corresponding client request.

14. The file virtualization device of claim 13, wherein the processor is further configured to store the generated Client ID as a new entry in a Client ID Table and replicate at least a portion of the Client ID Table to at least one other processor in the file virtualization device.

15. The file virtualization device of claim 13, wherein the processor is further configured to store the generated Client ID as a new entry in a Client ID Table and replicate at least a portion of the Client ID Table to at least one processor in another file virtualization device.

16. The file virtualization device of claim 13, wherein the processor is further configured to:
classify the endianness of the client as having a Big Endian format, a Little Endian format, an Unknown format or a Random format; and
store the classified endianness in a Classification table in the memory.

17. The file virtualization device of claim 16, wherein the processor, when determining the endianness, is further configured to:
receive and store a plurality of XIDs from the client for a set number of client requests;
compare a plurality of upper halfwords to identify a number of changed halfwords among adjacent upper halfwords in the set;
designate an entropy classification to the upper halfwords based on the number of identified changed halfwords among upper halfwords;
compare a plurality of lower halfwords to identify a number of changed halfwords among adjacent lower halfwords in the set;
designate an entropy classification to the lower halfwords based on the number of identified changed halfwords among lower halfwords; and
assign an XID classification to the client based on the entropy classifications designated to the upper and lower halfwords.

18. The file virtualization device of claim 13, wherein the endian'ness is classified as having the Random format, the processor is further configured to convert the first XID halfword to a zero bit value and generate the Client ID with the converted first XID halfword.

* * * * *